United States Patent
Budihal et al.

(10) Patent No.: US 9,881,209 B2
(45) Date of Patent: Jan. 30, 2018

(54) METHODS AND SYSTEMS FOR DETECTING TAMPERING IN A DOCUMENT IMAGE

(71) Applicant: Wipro Limited, Bangalore (IN)

(72) Inventors: Ramachandra Budihal, Bangalore (IN); Sujatha Jagannath, Bangalore (IN); Sendil Kumar Jaya Kumar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 50 days.

(21) Appl. No.: 15/087,504

(22) Filed: Mar. 31, 2016

(65) Prior Publication Data

US 2017/0277945 A1    Sep. 28, 2017

(30) Foreign Application Priority Data

Mar. 28, 2016    (IN) .............................. 201641010614

(51) Int. Cl.
*G06K 9/32*    (2006.01)
*G06K 9/00*    (2006.01)
*G06T 7/00*    (2017.01)

(52) U.S. Cl.
CPC ....... *G06K 9/00463* (2013.01); *G06K 9/3233* (2013.01); *G06T 7/0081* (2013.01); *G06T 2207/30168* (2013.01); *G06T 2207/30176* (2013.01)

(58) Field of Classification Search
CPC .............. G06K 9/00463; G06K 9/3233; G06T 7/0081; G06T 2207/3076; G06T 2207/30168

See application file for complete search history.

(56) References Cited

U.S. PATENT DOCUMENTS

| | | | |
|---|---|---|---|
| 9,189,482 B2 | 11/2015 | Danielyan et al. | |
| 9,235,573 B2 | 1/2016 | Danielyan et al. | |
| 2008/0013801 A1* | 1/2008 | Reed ................. | G06K 9/00885 382/118 |
| 2014/0201126 A1 | 7/2014 | Zadeh et al. | |
| 2015/0341370 A1* | 11/2015 | Khan ..................... | H04L 63/20 726/30 |

FOREIGN PATENT DOCUMENTS

| | | |
|---|---|---|
| WO | WO 2010/096193 A2 | 8/2010 |
| WO | WO 2013/014667 A2 | 1/2013 |

\* cited by examiner

*Primary Examiner* — Siamak Harandi
(74) *Attorney, Agent, or Firm* — Finnegan, Henderson, Farabow, Garrett & Dunner, LLP (57) ABSTRACT

In one embodiment, an image processing device for detecting tampering in a document image is disclosed. The image processing device comprises a processor and a memory communicatively coupled to the processor. The memory stores processor instructions, which, on execution, causes the processor to determine an image quality of the document image by analyzing one or more quality features extracted from the document image. The processor is caused to pre-process the document image based on a pre-defined ontology of documents when the image quality is above a pre-defined quality threshold. Further, the processor is caused to segment the pre-processed document image into one or more region of interests based on the pre-defined ontology of documents and detect tampering in a region of interest in the document image by processing each region of interest of the one or more region of interests to detect tampering in the document image.

16 Claims, 7 Drawing Sheets

METHODS AND SYSTEMS FOR DETECTING TAMPERING IN A DOCUMENT IMAGE

TECHNICAL FIELD

This disclosure relates generally to image processing, and more particularly to methods and systems for detecting tampering in a document image by processing the document image.

BACKGROUND

The detection of tampering in a document image can be used in various applications. Most prominently, the detection of tampering in the document image may be utilized for detecting fraud related to identity documents to verify identity of a person. The existing techniques of fraud detection are not entirely automated, thereby reducing the operational efficiency in terms of accuracy, comprehensive authentication, and transparent identity verification.

Moreover, in order to detect tampering accurately, contextual information from the identity document is extracted. The contextual information for each type of identity document is variable. The existing techniques, many-a-times, fail to identify or use the variance in the contextual information of each type of identity document.

SUMMARY

In one embodiment, a method for detecting tampering in a document image is disclosed. The method comprises determining, by an image processing device, an image quality of the document image by analyzing one or more quality features extracted from the document image. The method further comprises pre-processing, by the image processing device, the document image based on a pre-defined ontology of documents when the image quality is above a pre-defined quality threshold. The method comprises segmenting, by the image processing device, the pre-processed document image into one or more region of interests based on the pre-defined ontology of documents. The method further comprises detecting, by the image processing device, tampering in a region of interest of the one or more region of interests in the document image by processing each region of interest to detect tampering in the document image.

In one embodiment, an image processing device for detecting tampering in a document image is disclosed. The image processing device comprises a processor and a memory communicatively coupled to the processor. The memory stores processor instructions, which, on execution, causes the processor to determine an image quality of the document image by analyzing one or more quality features extracted from the document image. The processor is caused to pre-process the document image based on a pre-defined ontology of documents when the image quality is above a pre-defined quality threshold. Further, the processor is caused to segment the pre-processed document image into one or more region of interests based on the pre-defined ontology of documents and detect tampering in a region of interest in the document image by processing each region of interest of the one or more region of interests to detect tampering in the document image.

In one embodiment, a non-transitory computer-readable medium is disclosed, storing instructions executable by a hardware processor to perform a method. The method may include determining, via the hardware processor, an image quality of the document image by analyzing one or more quality features extracted from the document image. Further, the method may include pre-processing, via the hardware processor, the document image based on a pre-defined ontology of documents when the image quality is above a pre-defined quality threshold and segmenting, via the hardware processor, the pre-processed document image into one or more region of interests based on the pre-defined ontology of documents. The method may also include detecting, via the hardware processor, tampering in a region of interest of the one or more region of interests in the document image by processing each region of interest to detect tampering in the document image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for detecting tampering in a document image by processing the document image. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Working of the systems and methods for detecting tampering in a document image by processing the document image is described in conjunction with FIGS. 1-7. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
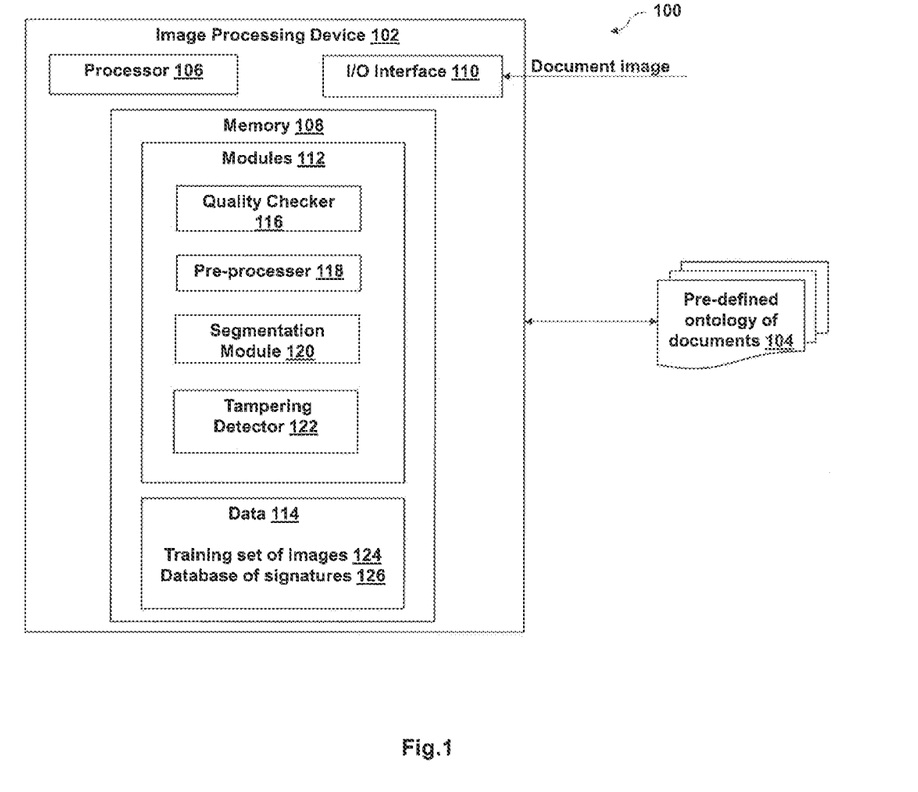
FIG. 1 illustrates an exemplary network implementation comprising an image processing device for detecting tampering in a document image, according to some embodiments of the present disclosure.

FIG. 1 illustrates an exemplary network implementation 100 comprising an image processing device 102 for detecting tampering in a document image according to some embodiments of the present disclosure. As shown in the FIG. 1, the image processing device 102 is communicatively coupled to a pre-defined ontology of documents 104. In one embodiment, the pre-defined ontology of documents 104 may be present within the image processing device 102. In one embodiment, the pre-defined ontology of documents 104 defines a relationship between a type of document and one or more regions of interests in the document image. In one embodiment, the pre-defined ontology of documents 104 defines a relationship between the type of document and one or more image characteristics of the document image. In one example, the relationship may be defined as a type of pre-processing required on the one or more image characteristics of the document image for a particular type of document.

The image processing device 102 may be communicatively coupled to the pre-defined ontology of documents 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc to communicate with each other. Further, the network may include a variety of network devices, including routers, bridges, servers, computing devices, storage devices, etc.

As shown in the FIG. 1, the image processing device 102 comprises a processor 106, a memory 108 coupled to the processor 106, and input/output (I/O) interface(s) 110. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions stored in the memory 108. The memory 108 can include any non-transitory computer-readable medium known in the art including, for example, volatile memory (e.g., RAM), and/or non-volatile memory (e.g., EPROM, flash memory, etc.).

The I/O interface(s) 110 may include a variety of software and hardware interfaces, for example, a web interface, a graphical user interface, etc., allowing the image processing device 102 to interact with the pre-defined ontology of documents 104. Moreover, the I/O interface 110 may allow a user to input a document image in which tampering may be detected. Further, the I/O interface(s) 110 may enable the image processing device 102 to communicate with other computing devices. The I/O interface(s) 110 can facilitate multiple communications within a wide variety of networks and protocol types, including wired networks, for example LAN, cable, etc., and wireless networks such as WLAN, cellular, or satellite. The I/O interface(s) 110 may include one or more ports for connecting a number of devices to each other or to another server.

In one implementation, the memory 108 includes modules 112 and data 114. In one example, the modules 112, amongst other things, include routines, programs, objects, components, and data structures, which perform particular tasks or implement particular abstract data types. The modules 112 and may also be implemented as, signal processor(s), state machine(s), logic circuitries, and/or any other device or component that manipulate signals based on operational instructions. Further, the modules 112 can be implemented by one or more hardware components, by computer-readable instructions executed by a processing unit, or by a combination thereof.

In one implementation, the data 114 serves, amongst other things, as a repository for storing data fetched, processed, received and generated by one or more of the modules 112. In one implementation, the data 114 may include training set of images 124 and a database of signatures 126. In one embodiment, the data 114 may be stored in the memory 108 in the form of various data structures. Additionally, the aforementioned data can be organized using data models, such as relational or hierarchical data models. In an example, the data 114 may also comprise other data used to store data, including temporary data and temporary files, generated by the modules 112 for performing the various functions of the image processing device 102.

In one implementation, the modules 112 further include a quality checker 116, a pre-processor 118, a segmentation module 120, and a tampering detector 122. In an example, the modules 112 may also comprise other modules. The other modules may perform various miscellaneous functionalities of the image processing device 102. It will be appreciated that such aforementioned modules may be represented as a single module or a combination of different modules.

In order to detect tampering in a document image, the quality checker 116 may determine an image quality of the document image by analyzing one or more quality features extracted from the document image. The image quality may be a characteristic of an image that measures the perceived image degradation. The quality features may comprise, but is not limited to, contrast, noise, sharpness, and distortion.

Figure 3:
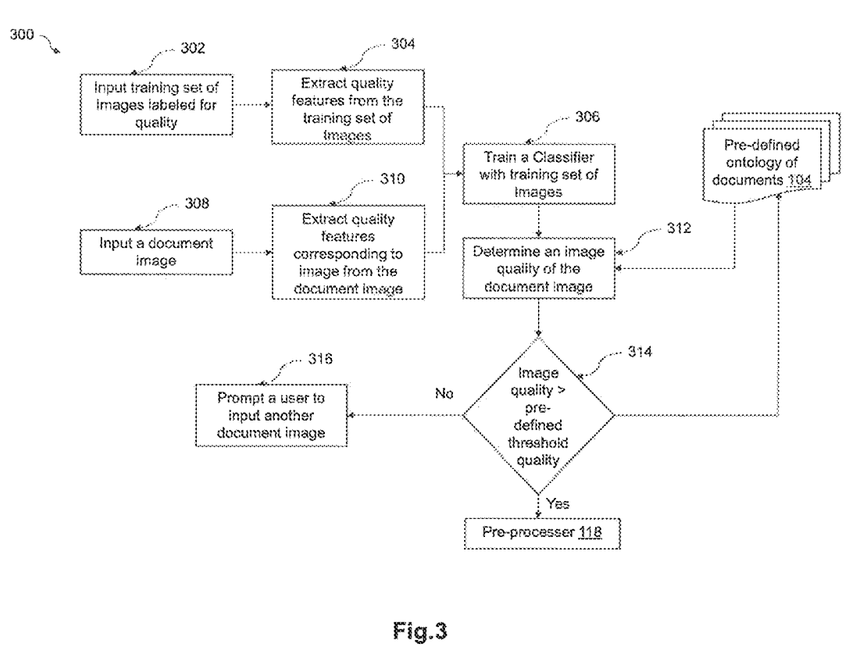
FIG. 3 is a flow diagram illustrating a method for determining an image quality of the document image by analyzing one or more quality features extracted from the document image in accordance with some embodiments of the present disclosure.

The determining of the image quality of the document image may be explained in detail in conjunction with FIG. 3

After determining the image quality, the quality checker 116 may check if the image quality is equal to or above a pre-defined quality threshold. If the image quality is less than the pre-defined quality threshold, the document image may be discarded and a user may be prompted to input another document image of a better quality.

On the other hand, if the image quality is equal to or above the pre-defined quality threshold, the pre-processor 118 may pre-process the document image based on the pre-defined ontology of documents 104. In order to pre-process the document image, the pre-processor 118 may extract one or more image characteristics from the document image. The one or more image characteristics may comprise, but is not limited to, contrast, sharpness, layout, brightness, and orientation. Further, the pre-processor 118 may pre-process the one or more image characteristics based on the pre-defined ontology of documents 104. The pre-defined ontology of documents 104 may define a type of pre-processing required on an image characteristic of the one or more image characteristics. The type of pre-processing required on the one or more image characteristics may comprise perspective correction, skew correction, improvising brightness, or the like.

In one example, if the document image corresponds to a driving license, the pre-defined ontology of documents 104 may define a type of pre-processing required on an image characteristic of the driving license. In an embodiment, the pre-defined ontology of documents 104 may comprise groups of driving licenses, wherein each group corresponds to a state in the United States of America. In the embodiment, the pre-defined ontology of documents 104 may define a type of pre-processing required on the one or more image characteristics of the driving license of a particular group. In an example, consider that the driving license is of New Jersey State of the United States of America. The pre-defined ontology of documents 104 may specify changing brightness and contrast of photo of a license holder in the driving license.

In another example, if the driving license is of Tennessee State of the United States of America, the pre-defined ontology of documents 104 may specify changing brightness of written text in the driving license. The type of pre-processing required may be identified based on knowledge learnt or gathered over a period of time corresponding to the driving licenses of the New Jersey State or the driving licenses of the Tennessee State. The pre-defined ontology of documents 104 may be dynamically updated after each pre-processing on each document image. Thus, based on each updating, the pre-defined ontology of documents 104 may evolve to define type of pre-processing required for the one or more image characteristics in the document image.

After pre-processing the document image, the segmentation module 120 may segment the document image into one or more region of interests based on the pre-defined ontology of documents 104. The one or more region of interests may comprise, but is not limited to, photo, logo, printed text, handwritten text, and signature. The one or more region of interests for the document image may be defined by the pre-defined ontology of documents 104 based on a document type. In one example, if the document type is a driving license, then the region of interests may comprise, photo of the license holder, signature of the license holder, and printed text comprising name of the license holder. In another example, if the document type is a company identification card, the one or more region of interests may comprise photo of identity card holder and printed text comprising name of the identity card holder. The pre-defined ontology of documents 104 may be dynamically updated after each segmentation of the document image into the one or more region of interests. Thus, based on each updating, the pre-defined ontology of documents 104 may evolve to define the one or more region of interests of the document image for the document type.

After segmenting the document image into the one or more region of interests, the tampering detector 122 may detect tampering in a region of interest in the document image by processing each region of interest to detect tampering in the document image. The one or more region of interests may be processed to detect tampering by comparing a tampering measure of the region of interest with a measurement threshold. The tampering measure of each region of interest may be defined by the pre-defined ontology of documents 104. The tampering measure of a region of interest may be sharpness index, signal to noise ratio, contrast, or the like.

In one example, consider that the document image corresponds to a driving license. The one or more region of interests for the driving license may comprise photo of the license holder, signature of the license holder, and printed text comprising name, address and other details of the license holder. In order to detect tampering in the photo of the license holder, the signature of the license holder, and the printed text, different tampering measures may be identified corresponding to each of the regions of interest. The tampering detector 122 may identify and learn the tampering measures over various region of interests for a given template of a New Jersey driving license and archive it as training information against a template of New Jersey driving license into the pre-defined ontology of documents 104. When a driving license of New Jersey State is provided as an input for detecting tampering, the tampering detector 122 may compute respective tampering measures for the regions of interest based on the training information archived in the pre-defined ontology of documents 104.

To detect tampering in the photo of the license holder, a relative sharpness index of the photo in the driving license may be compared with a pre-defined relative sharpness index range. If the relative sharpness index is within the pre-defined relative sharpness index range, the photo may be determined as genuine. If the relative sharpness index is outside the pre-defined relative sharpness index range, the tampering may be detected in the photo of the license holder.

Further, to detect tampering in the signature of the license holder, the signature extracted from the document image may be verified by matching the signature with a signature from a database of signatures 126. In one embodiment, the database of signatures 126 may be stored in the memory 108. In another embodiment, the database of signatures 126 may be stored in a back end server. If the signature is verified, the signature may be determined as genuine. If the signature is not verified, tampering may be detected in the signature of the license holder.

In addition to the photo of the license holder and the signature of the license holder, tampering in the printed text may be detected. To detect tampering in the printed text, a font dissimilarity measure may be calculated and may be compared with a pre-defined font dissimilarity measure. If the font dissimilarity measure is within a pre-defined font dissimilarity measure range, the printed text may be determined as genuine. If the font dissimilarity measure is outside the pre-defined font dissimilarity measure range, the tampering may be detected in the printed text.

After detecting the tampering in a region of interest, the tampering detector 122 may detect tampering in the document image. To detect the tampering in the document image, a weighted average of the pre-defined weightage of each tampering in the region of interest may be computed. The weighted average may be further compared with a pre-defined threshold value. If the weighted average is above the pre-defined threshold value, the tampering may be detected in the document image. If the weighted average is less than the pre-defined threshold value, the document image may be determined as genuine. If the weighted average is comparable to the pre-defined threshold value, the document image may be submitted for manual processing.

In one embodiment, if the tampering is detected in the photo of the license holder, and the signature of the license holder and the printed text is determined as genuine, the tampering may be detected in the document image. In another embodiment, if the tampering is detected in the photo of the license holder but the signature of the license holder and the printed text is determined as genuine, the tampering may be detected in the document image. In yet another embodiment, if the tampering is not detected in any region of interest and each region of interest is determined as genuine, the document image may be determined as genuine. In another embodiment, the tampering detector 122 may be unable to confirm whether tampering exists in the document image or the document image is genuine and is submitted for manual processing.

Figure 2:
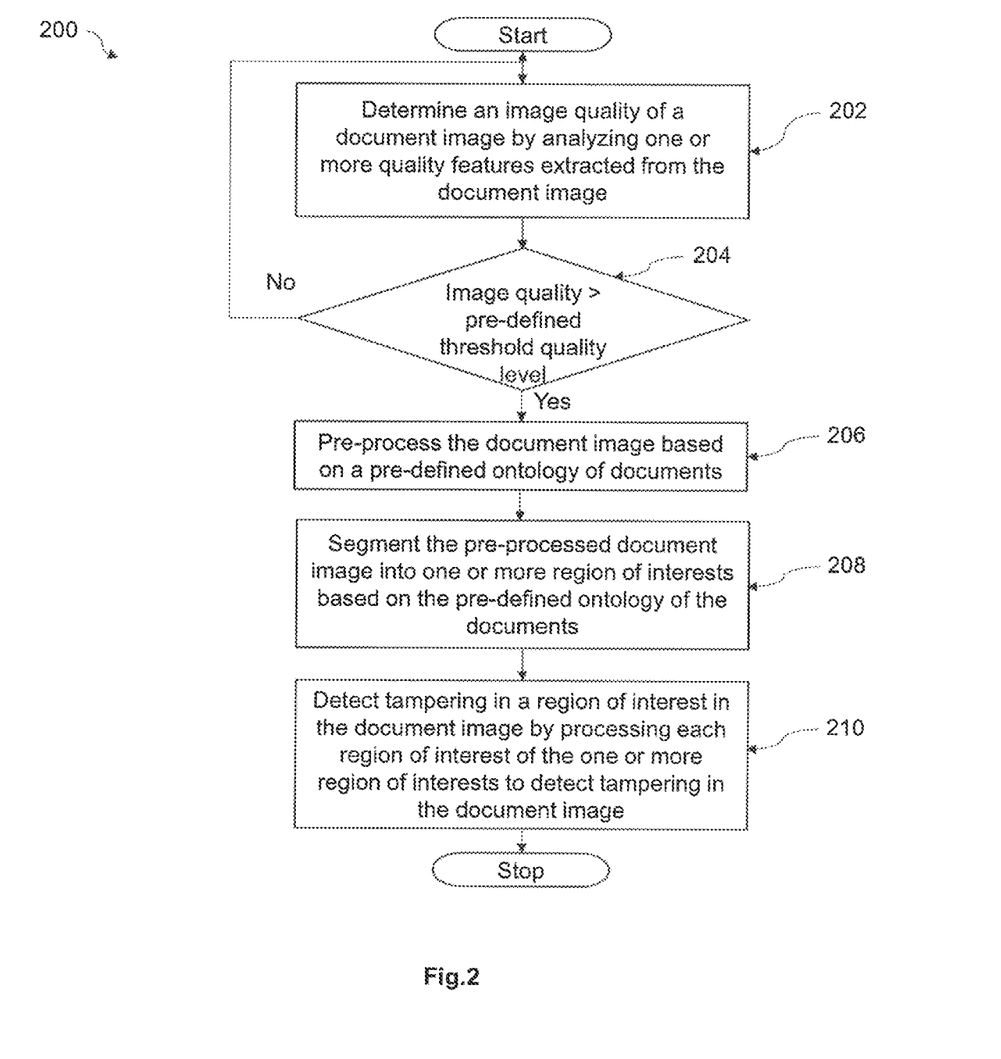
FIG. 2 is a flow diagram illustrating a method for detecting tampering in a document image in accordance with some embodiments of the present disclosure.

FIG. 2 is a flow diagram illustrating a method 200 for detecting tampering in a document image in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202, an image quality of the document image may be determined by analyzing one or more quality features extracted from the document image. The image quality may be a characteristic of an image that measures the perceived image degradation. The quality features may comprise, but is not limited to, contrast, noise, sharpness, and distortion. The determining of the image quality of the document image may be explained in detail in conjunction with FIG. 3

At block 204, the image quality may be compared with a pre-defined quality threshold. If the image quality is less than the pre-defined quality threshold, the document image may be discarded and a user may be prompted to input another document image of a better quality.

At block 206, if the image quality is equal to or above the pre-defined quality threshold, the document image may be pre-processed based on the pre-defined ontology of documents 104. In order to pre-process the document image, one or more image characteristics may be extracted from the document image. The one or more image characteristics may comprise, but is not limited to, contrast, sharpness, layout, brightness, and orientation. Further, the one or more image characteristics may be pre-processed based on the pre-defined ontology of documents 104. The pre-defined ontology of documents 104 may define a type of pre-processing required on an image characteristic of the one or more image characteristics. The pre-processing of the document image is explained in detail in conjunction with the FIG. 1.

At block 208, the pre-processed document image may be segmented into one or more region of interests based on the pre-defined ontology of documents 104. The one or more region of interests may comprise, but is not limited to, photo, logo, printed text, handwritten text, and signature. The one or more region of interests for the document image may be defined by the pre-defined ontology of documents 104 based on a document type. The segmenting of the pre-processed document image is explained in detail in conjunction with the FIG. 1.

At block 210, tampering in a region of interest of the one or more region of interests in the document image may be detected by processing each region of interest to detect tampering in the document image. The one or more region of interests may be processed to detect tampering by comparing a tampering measure of the region of interest with a measurement threshold. The tampering measure of each region of interest may be defined by the pre-defined ontology of documents 104. The tampering measure of a region of interest may be a relative sharpness index, signal to noise ratio, contrast, a font dissimilarity measure, a similarity index, or the like. The detecting of the tampering in the document image is explained in detail in conjunction with the FIG. 1.

FIG. 3 is a flow diagram illustrating a method for determining an image quality of the document image by analyzing one or more quality features extracted from the document image in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to the FIG. 3, at block 302, a training set of images 124 may be provided as input to the quality checker 116. Each image of the training set of images 124 may be labelled for quality.

At block 304, quality features may be extracted from the training set of images 124. The quality features may comprise, but is not limited to, contrast, noise, sharpness, and distortion.

At block 306, a classifier may be trained using the training set of images.

At block 308, a document image may be provided as input to the quality checker 116. Further, at block 310, quality features corresponding to image may be extracted from the document image. The quality features extracted from the document image may be provided as an input to the classifier.

At block 310, an image quality of the document image may be determined based on an input from the classifier and the pre-defined ontology of documents 104.

At block 312, the image quality may be compared with pre-defined threshold quality. If the image quality less than the pre-defined threshold quality, at block 314, the user may be prompted to input another image of a better quality.

If the image quality is equal to or above the pre-defined threshold quality, the document image may be provided as an input to the pre-processor 118 for further processing.

The output of the quality checker 116 may be provided as a feedback to the pre-defined ontology of documents 104. Thus, the pre-defined ontology of documents 104 may evolve owing to dynamic updating after each quality check of the document image.

Figure 4:
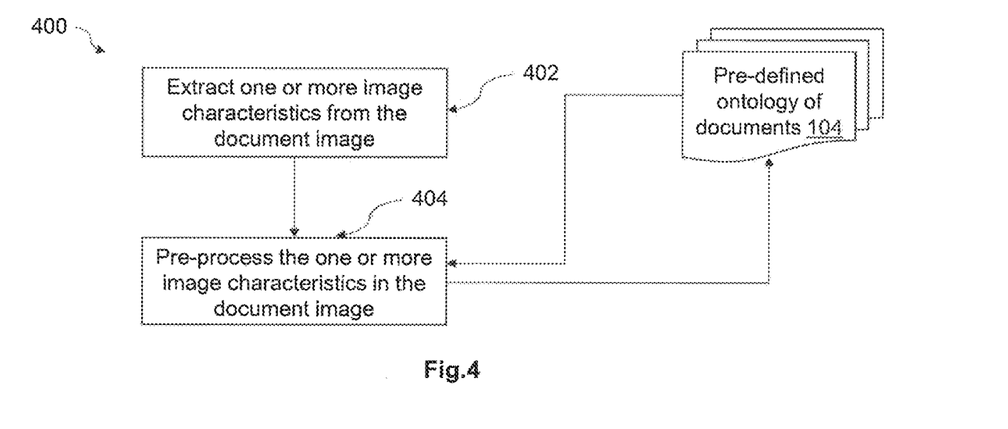
FIG. 4 is a flow diagram illustrating a method for pre-processing the document image based on a pre-defined ontology of documents in accordance with some embodiments of the present disclosure.

FIG. 4 is a flow diagram illustrating a method for pre-processing the document image based on a pre-defined ontology of documents in accordance with some embodiments of the present disclosure.

The method 400 may be described in the general context of computer executable instructions. Generally, computer executable instructions can include routines, programs, objects, components, data structures, procedures, modules, and functions, which perform particular functions or implement particular abstract data types. The method 400 may also be practiced in a distributed computing environment where functions are performed by remote processing devices that are linked through a communication network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternative methods. Additionally, individual blocks may be deleted from the method 400 without departing from the spirit and scope of the subject matter described herein. Furthermore, the method 400 can be implemented in any suitable hardware, software, firmware, or combination thereof.

With reference to the FIG. 4, at block 402, when the image quality is above the pre-defined threshold quality, one or more image characteristics may be extracted from the document image. The one or more image characteristics may comprise, but is not limited to, contrast, sharpness, layout, brightness, and orientation.

At block 404, the one or more image characteristics in the document image may be pre-processed based on an input from the pre-defined ontology of documents 104. The pre-defined ontology of documents 104 may define a type of pre-processing required on an image characteristic of the one or more image characteristics. The pre-defined ontology of documents 104 may be dynamically updated after each pre-processing on each document image. Thus, based on each updating, the pre-defined ontology of documents 104 may evolve to define type of pre-processing required for the one or more image characteristics in the document image. The pre-processing of the document image is explained in detail in conjunction with the FIG. 1.

Figure 5:
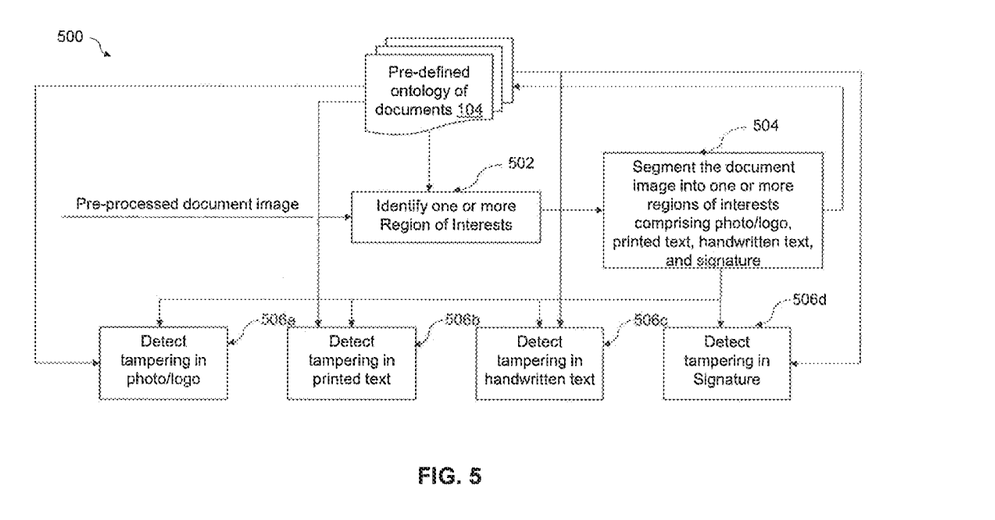
FIG. 5 is a flow diagram illustrating a method for detecting tampering in a region of interest in accordance with some embodiments of the present disclosure.

FIG. 5 is a flow diagram illustrating a method for detecting tampering in a region of interest in accordance with some embodiments of the present disclosure.

The method 500 may be described in the general context of computer executable instructions. Generally, computer executable instructions can include routines, programs, objects, components, data structures, procedures, modules, and functions, which perform particular functions or implement particular abstract data types. The method 500 may also be practiced in a distributed computing environment where functions are performed by remote processing devices that are linked through a communication network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternative methods. Additionally, individual blocks may be deleted from the method 500 without departing from the spirit and scope of the subject matter described herein. Furthermore, the method 500 can be implemented in any suitable hardware, software, firmware, or combination thereof.

With reference to the FIG. 5, at block 502, one or more region of interests may be identified in the pre-processed document image. The one or more region of interests may be identified based on an input from the pre-defined ontology of documents 104. The one or more region of interests may comprise, but is not limited to, photo, logo, printed text, handwritten text, and signature.

At block 504, the pre-processed document image may be segmented into the one or more region of interests. The pre-defined ontology of documents 104 may be dynamically updated after each segmentation of the document image into the one or more region of interests. Thus, based on each updating, the pre-defined ontology of documents 104 may evolve to define the one or more region of interests of the document image for the document type. The segmenting of the pre-processed document image is explained in detail in conjunction with the FIG. 1.

After segmenting the document image into the one or more region of interests, tampering may be detected in a region of interest in the document image by processing each region of interest to detect tampering in the document image. The one or more region of interests may be processed to detect tampering by comparing a tampering measure of the region of interest with a measurement threshold. The tampering measure of each region of interest may be defined by the pre-defined ontology of documents 104. The tampering measure of a region of interest may be sharpness index, signal to noise ratio, contrast, or the like.

At block 506a, tampering may be detected in the photo or logo of the document image. In order to detect tampering in the photo, the tampering measure may identified as a relative sharpness index. The relative sharpness index of the photo may be compared with a pre-defined relative sharpness index range. If the relative sharpness index is within the pre-defined relative sharpness index range, the photo may be determined as genuine. If the relative sharpness index is outside the pre-defined relative sharpness index range, the tampering may be detected in the photo of the license holder.

At block 506*b*, tampering may be detected in the printed text of the document image. To detect tampering in the printed text, a font dissimilarity measure may be compared with a pre-defined font dissimilarity measure range. If the font dissimilarity measure is within the pre-defined font dissimilarity measure range, the printed text may be determined as genuine. If the font dissimilarity measure is outside the pre-defined font dissimilarity measure range, the tampering may be detected in the printed text.

At block 506*c*, tampering may be detected in the handwritten text of the document image. To detect tampering in the handwritten text, a similarity index may be compared with a pre-defined similarity index range. If the similarity index is within the pre-defined similarity index range, the handwritten text may be determined as genuine. If the similarity index is outside the pre-defined similarity index range, the tampering may be detected in the handwritten text.

At block 506*d*, tampering may be detected in the signature on the document image. To detect tampering in the signature, the signature extracted from the document image may be verified by matching the signature with a signature from a database of signatures 126. In one embodiment, the database of signatures 126 may be stored in the memory 108. In another embodiment, the database of signatures may be stored in a back end server. If the signature is verified, the signature may be determined as genuine. If the signature is not verified against the database of signatures 126, the tampering may be detected in the signature. The detecting of tampering in the region of interest is explained in detail in conjunction with the FIG. 1.

Figure 6:
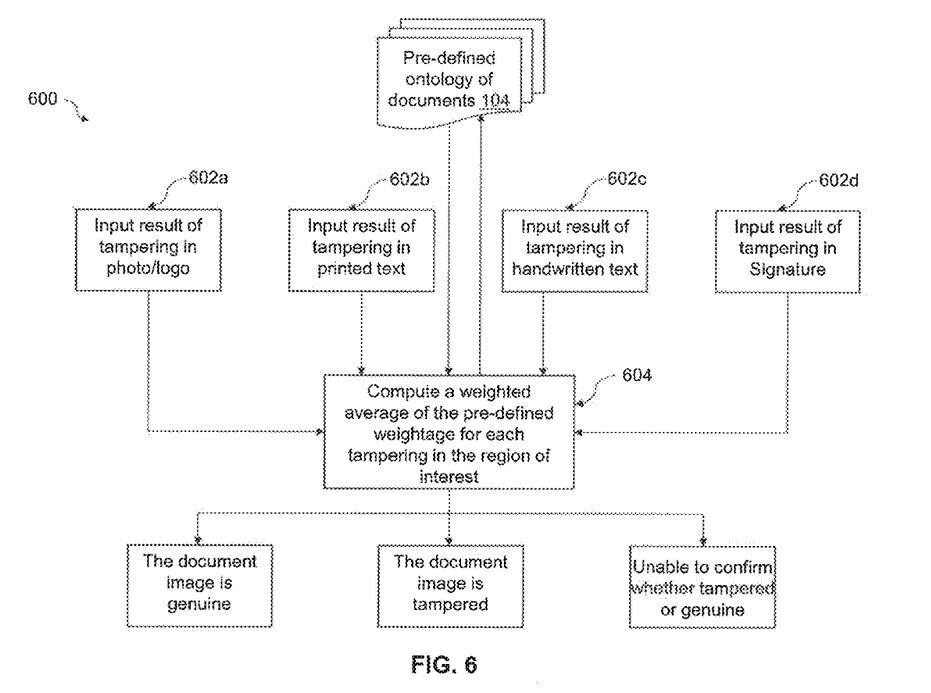
FIG. 6 is a flow diagram illustrating a method for detecting tampering in the document image based on the tampering in a region of interest in accordance with some embodiments of the present disclosure.

FIG. 6 is a flow diagram illustrating a method for detecting tampering in the document based on the tampering in a region of interest in accordance with some embodiments of the present disclosure.

The method 600 may be described in the general context of computer executable instructions. Generally, computer executable instructions can include routines, programs, objects, components, data structures, procedures, modules, and functions, which perform particular functions or implement particular abstract data types. The method 600 may also be practiced in a distributed computing environment where functions are performed by remote processing devices that are linked through a communication network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternative methods. Additionally, individual blocks may be deleted from the method 600 without departing from the spirit and scope of the subject matter described herein. Furthermore, the method 600 can be implemented in any suitable hardware, software, firmware, or combination thereof.

With reference to the FIG. 6, at block 602*a*, result of tampering in the photo or logo may be provided as an input to detect the tampering in the document image.

At block 602*b*, result of tampering in the printed text may be provided as an input to detect the tampering in the document image.

At block 602*c*, result of tampering in the handwritten text may be provided as an input to detect the tampering in the document image.

At block 602*d*, result of tampering in the signature may be provided as an input to detect the tampering in the document image.

At block 604, a weighted average of the pre-defined weightage for each tampering in the region of interest may be computed. The weighted average may be further compared with a pre-defined threshold value. If the weighted average is above the pre-defined threshold value, the tampering may be detected in the document image. If the weighted average is less than the pre-defined threshold value, the document image may be genuine. In certain scenarios, the tampering detector 122 may be unable to confirm whether the document image is genuine or the tampering exists in the document image and may forward the document for manual processing.

In one embodiment, the weighted average may be provided as feedback to the pre-defied ontology of documents 104. The pre-defined ontology of documents 104 may be dynamically updated after each detection in the tampering of the document image. Thus, based on each updating, the pre-defined ontology of documents 104 may evolve to define the pre-defined threshold value for a tampering measure. The pre-defined ontology of documents may also evolve to define the tampering measure for each region of interest to detect tampering in the document image.

The image processing device 102 and the method disclosed herein extracts image characteristics and identifies region of interests in the document image based on a type of the document image and pre-defined ontology of documents 104. The pre-defined ontology of documents 104 is dynamically updated after each iteration based on at least one of type of pre-processing on the document image, the one or more region of interests obtained through segmentation on the pre-processed document image, and the tampering detected in the region of interest. Thus, the pre-defined ontology of documents evolves over a time period to define accurate relationship between the type of the document, the region of interests, and the image characteristics which require pre-processing.

As the pre-processing is performed only on one or more image characteristics of the document image, rather than pre-processing the entire document image, processing power of the image processing device 102 is conserved. Also, the time required for processing the document image is less.

Computer System

Figure 7:
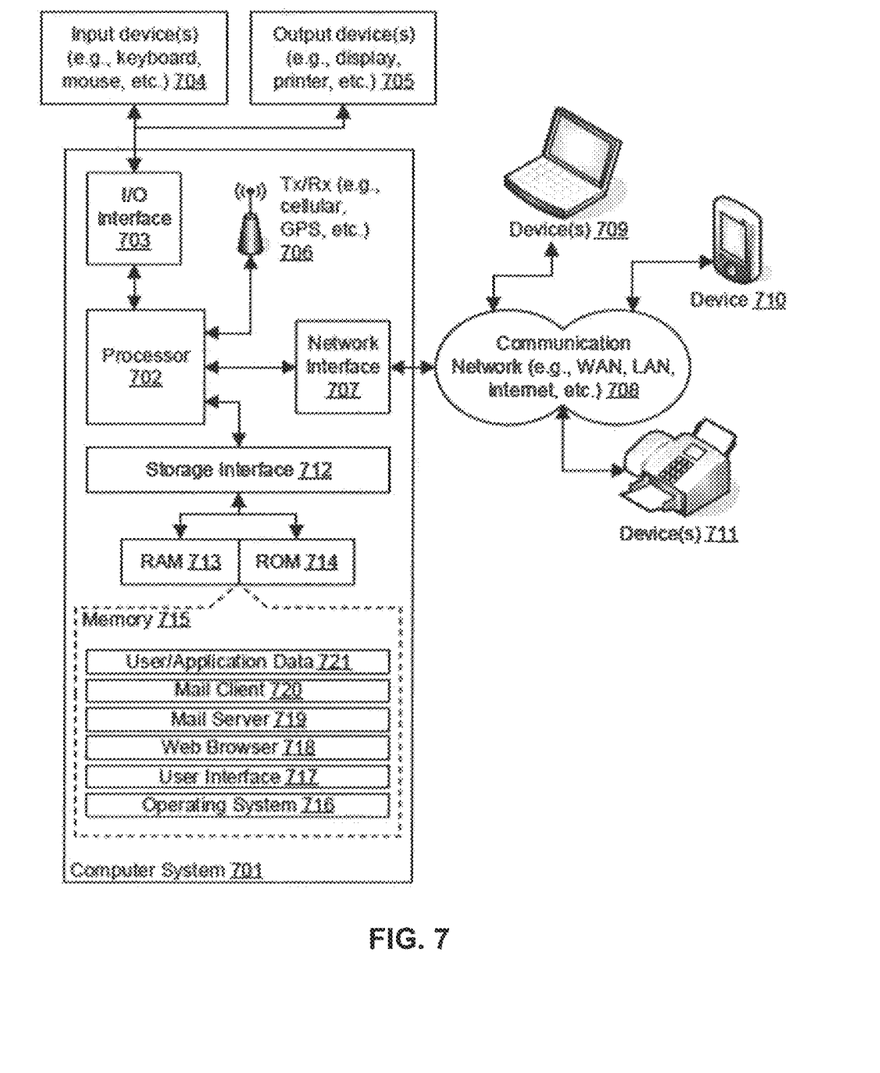
FIG. 7 is a block diagram of an exemplary computer system for implementing embodiments consistent with the present disclosure.

FIG. 7 is a block diagram of an exemplary computer system for implementing embodiments consistent with the present disclosure. Variations of computer system 701 may be used for implementing the quality checker 116, the pre-processor 118, the segmentation module 120, and the tampering detector 122. Computer system 701 may comprise a central processing unit ("CPU" or "processor") 702. Processor 702 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 710, 711, and 712. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for detecting tampering in a document image by processing the document image. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting tampering in a document image, the method comprising:
   determining, by an image processing device, an image quality of the document image by analyzing one or more quality features extracted from the document image;
   pre-processing, by the image processing device, the document image based on a pre-defined ontology of documents when the image quality is above a pre-defined quality threshold;
   segmenting, by the image processing device, the pre-processed document image into one or more regions of interest based on the pre-defined ontology of documents;
   assigning, by the image processing device, a pre-defined weightage to a tampering in the one or more regions of interest;
   determining, by the image processing device, a weighted average of the pre-defined weightage for each tampering in the one or more regions of interest by processing each region of interest; and
   detecting, by the image processing device, tampering in the document image when a weighted average of the pre-defined weightage for each tampering in the one or more regions of interest is above a pre-defined threshold value.

2. The method of claim 1, wherein pre-processing the document image comprises:
   extracting one or more image characteristics from the document image; and
   pre-processing the one or more image characteristics based on the pre-defined ontology of documents, wherein the pre-defined ontology defines a type of pre-processing required on an image characteristic of the one or more image characteristics.

3. The method of claim 2, wherein the one or more image characteristics comprises contrast, sharpness, layout, and orientation.

4. The method of claim 1, wherein the one or more regions of interest in the document image is at least one of photo, logo, printed text, handwritten text, and signature.

5. The method of claim 1, wherein the pre-defined ontology of documents defines the one or more regions of interest for the document image based on a document type.

6. The method of claim 1, wherein the pre-defined ontology is dynamically updated in each iteration based on at least one of type of pre-processing on the document image, the one or more regions of interest obtained through segmentation on the pre-processed document image, and the tampering detected in the one or more regions of interest.

7. An image processing device for detecting tampering in a document image, the image processing device comprising:
   a processor; and
   a memory communicatively coupled to the processor, wherein the memory stores processor instructions, which, on execution, causes the processor to:
   determine an image quality of the document image by analyzing one or more quality features extracted from the document image;
   pre-process the document image based on a pre-defined ontology of documents when the image quality is above a pre-defined quality threshold;
   segment the pre-processed document image into one or more regions of interest based on the pre-defined ontology of documents;
   assign a pre-defined weightage to a tampering in the one or more regions of interest;
   determine a weighted average of the pre-defined weightage for each tampering in the one or more regions of interest by processing each region of interest; and
   detect tampering in the document image when a weighted average of the pre-defined weightage for each tampering in the one or more regions of interest is above a pre-defined threshold value.

8. The image processing device of claim 7, wherein the processor is further caused to:
   extract one or more image characteristics from the document image; and
   pre-process the one or more image characteristics based on the pre-defined ontology of documents, wherein the pre-defined ontology defines a type of pre-processing required on an image characteristic of the one or more image characteristics.

9. The image processing device of claim 8, wherein the one or more image characteristics comprises contrast, sharpness, layout, and orientation.

10. The image processing device of claim 7, wherein the one or more regions of interest in the document image is at least one of photo, logo, printed text, handwritten text, and signature.

11. The image processing device of claim 7, wherein the pre-defined ontology of documents defines the one or more regions of interest for the document image based on a document type.

12. The image processing device of claim 7, wherein the pre-defined ontology is dynamically updated in each iteration based on at least one of type of pre-processing on the document image, the one or more regions of interest obtained through segmentation on the pre-processed document image, and the tampering detected in the one or more regions of interest.

13. A non-transitory computer-readable medium storing instructions executable by a hardware processor for:
   determining, via the hardware processor, an image quality of the document image by analyzing one or more quality features extracted from the document image;
   pre-processing, via the hardware processor, the document image based on a pre-defined ontology of documents when the image quality is above a pre-defined quality threshold;
   segmenting, via the hardware processor, the pre-processed document image into one or more regions of interest based on the pre-defined ontology of documents;
   assigning a pre-defined weightage to a tampering in the one or more regions of interest;
   determining a weighted average of the pre-defined weightage for each tampering in the one or more regions of interest by processing each region of interest; and
   detecting tampering in the document image when a weighted average of the pre-defined weightage for each tampering in the one or more regions of interest is above a pre-defined threshold value.

14. The medium of claim 13, wherein the one or more image characteristics comprises contrast, sharpness, layout, and orientation.

15. The medium of claim 13, wherein the one or more regions of interest in the document image is at least one of photo, logo, printed text, handwritten text, and signature.

16. The medium of claim 13, wherein the pre-defined ontology of documents defines the one or more region of interest for the document image based on a document type.

\* \* \* \* \*